(12) United States Patent
Lanoue et al.

(10) Patent No.: US 6,692,245 B1
(45) Date of Patent: Feb. 17, 2004

(54) MOLD FOR MAKING A WINDOW FRAME

(75) Inventors: Michel Lanoue, Pintendre (CA);
Jean-Francois Lavoie, Levis (CA);
Randall Leach, Davisburg, MI (US);
Gary Meyers, East China, MI (US)

(73) Assignee: IPL Inc., St-Damien-de-Bellechasse (CA)

( * ) Notice: Subject to any disclaimer, the term of this patent is extended or adjusted under 35 U.S.C. 154(b) by 0 days.

(21) Appl. No.: 09/471,595

(22) Filed: Dec. 23, 1999

Related U.S. Application Data

(63) Continuation-in-part of application No. 09/134,795, filed on Aug. 14, 1998, now abandoned.

(30) Foreign Application Priority Data

Aug. 18, 1997 (CA) .............................................. 2213379

(51) Int. Cl.⁷ .............................................. B29C 45/06
(52) U.S. Cl. ...................... 425/112; 425/120; 425/556; 425/443; 425/DIG. 58
(58) Field of Search ................................. 264/318, 255; 425/DIG. 58, 556, 443, 112, 120, 125

(56) References Cited

U.S. PATENT DOCUMENTS

| | | | |
|---|---|---|---|
| 3,987,144 A | * 10/1976 | Nickold | 264/318 |
| 4,119,325 A | 10/1978 | Oakley et al. | 277/207 R |
| 4,442,055 A | 4/1984 | Oelsch et al. | 264/105 |
| 4,444,711 A | 4/1984 | Schad | 264/243 |
| 4,466,644 A | 8/1984 | Wooten et al. | 292/263 |
| 4,469,370 A | 9/1984 | Petersen | 296/218 |
| 4,495,740 A | 1/1985 | Sarrazin et al. | 52/309.1 |
| 4,502,659 A | * 3/1985 | Stephenson et al. | 249/66 R |
| 4,725,093 A | 2/1988 | Betteridge | 296/223 |
| 4,732,724 A | 3/1988 | Sterner | 264/251 |
| 4,842,540 A | 6/1989 | Endo et al. | 439/271 |
| 4,885,121 A | 12/1989 | Patel | 264/255 |
| 4,903,997 A | 2/1990 | Kifer | 285/43 |
| 4,953,907 A | 9/1990 | Sugita | 296/93 |
| 5,008,060 A | 4/1991 | Kanai et al. | 264/255 |
| 5,030,406 A | 7/1991 | Sorensen | 264/255 |
| 5,050,928 A | 9/1991 | Bohm et al. | 296/428 |
| 5,053,178 A | 10/1991 | Butlin et al. | 264/254 |
| 5,078,444 A | 1/1992 | Shirahata et al. | 296/93 |
| 5,083,835 A | 1/1992 | Rossini | 296/201 |
| 5,085,021 A | 2/1992 | Kunert | 52/208 |
| 5,091,131 A | 2/1992 | Schumacher et al. | 264/112 |
| 5,106,565 A | 4/1992 | Saitoh | 264/263 |
| 5,136,773 A | 8/1992 | Mesnel et al. | 29/527.4 |
| 5,170,587 A | 12/1992 | Nakatani et al. | 49/490 |
| 5,256,048 A | 10/1993 | Jacobs et al. | 425/130 |
| 5,401,453 A | 3/1995 | Moretz et al. | 264/161 |
| 5,413,743 A | 5/1995 | Prophet | 264/1.7 |
| 5,503,452 A | 4/1996 | Moretz et al. | 296/224 |
| 5,756,013 A | 5/1998 | Yanagihara et al. | 264/1.7 |
| 5,846,473 A | * 12/1998 | Sorensen et al. | 264/31 |

* cited by examiner

*Primary Examiner*—Robert Davis
*Assistant Examiner*—Joseph S Del Sole

(57) ABSTRACT

An apparatus for forming a frame including a rigid thermoplastic portion and a resilient portion defining a lip seal. In particular, a core/cavity mold assembly is provided, wherein the rigid thermoplastic portion is formed, by opening the mold assembly while maintaining the rigid thermoplastic portion in the core, placing the core in line with a second cavity configured and sized to form the lip seal and molding the lip seal directly onto the rigid thermoplastic portion. The mold cavity is provided with movable internal and external stripper rings that allow the resilient portion to be removed from the cavity.

8 Claims, 12 Drawing Sheets

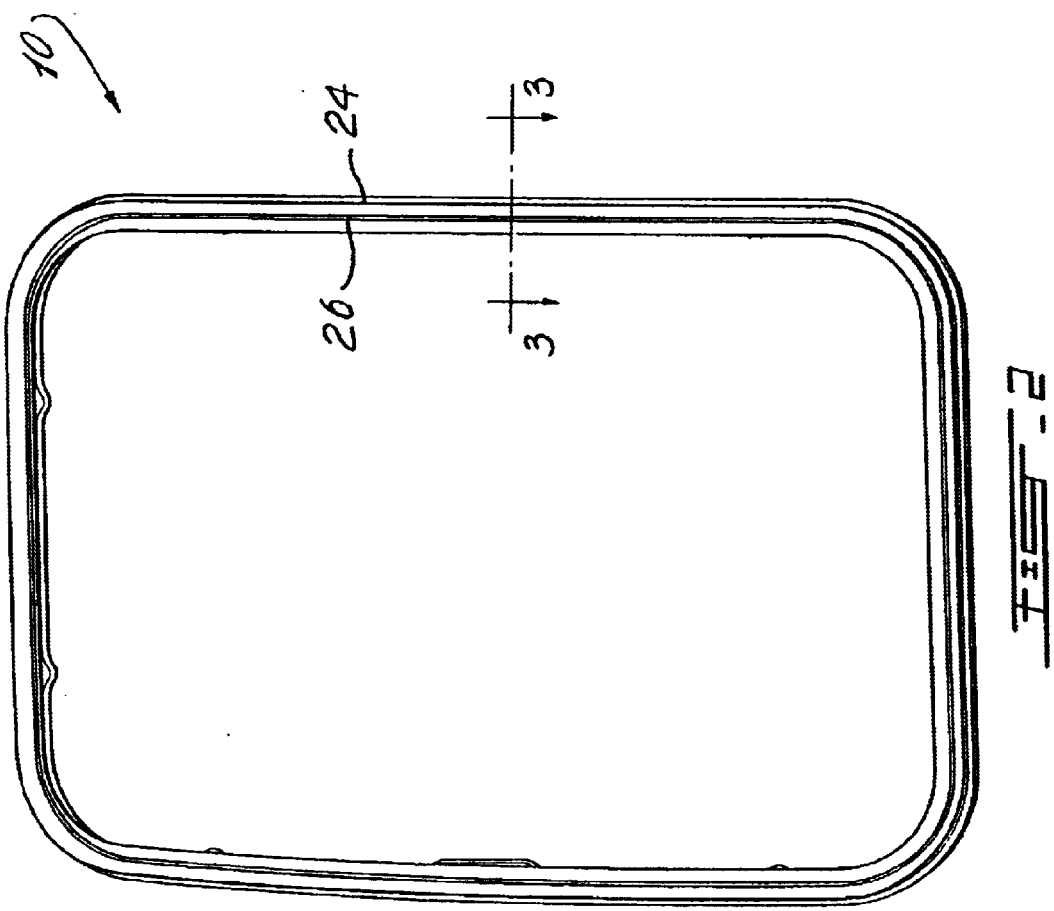
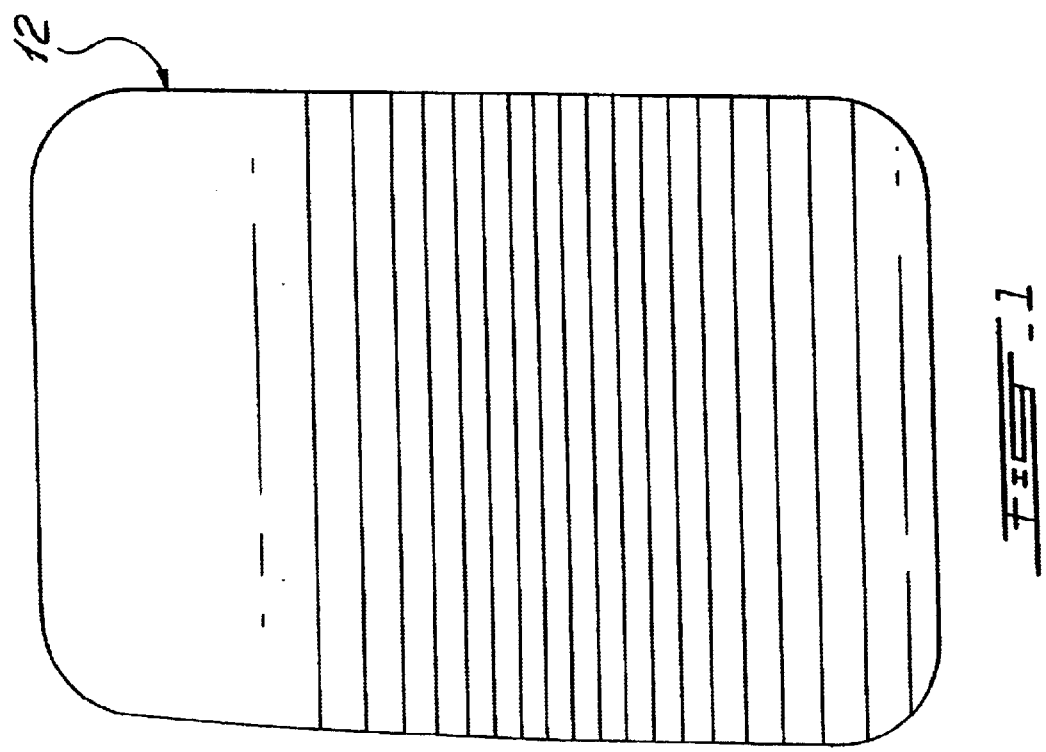

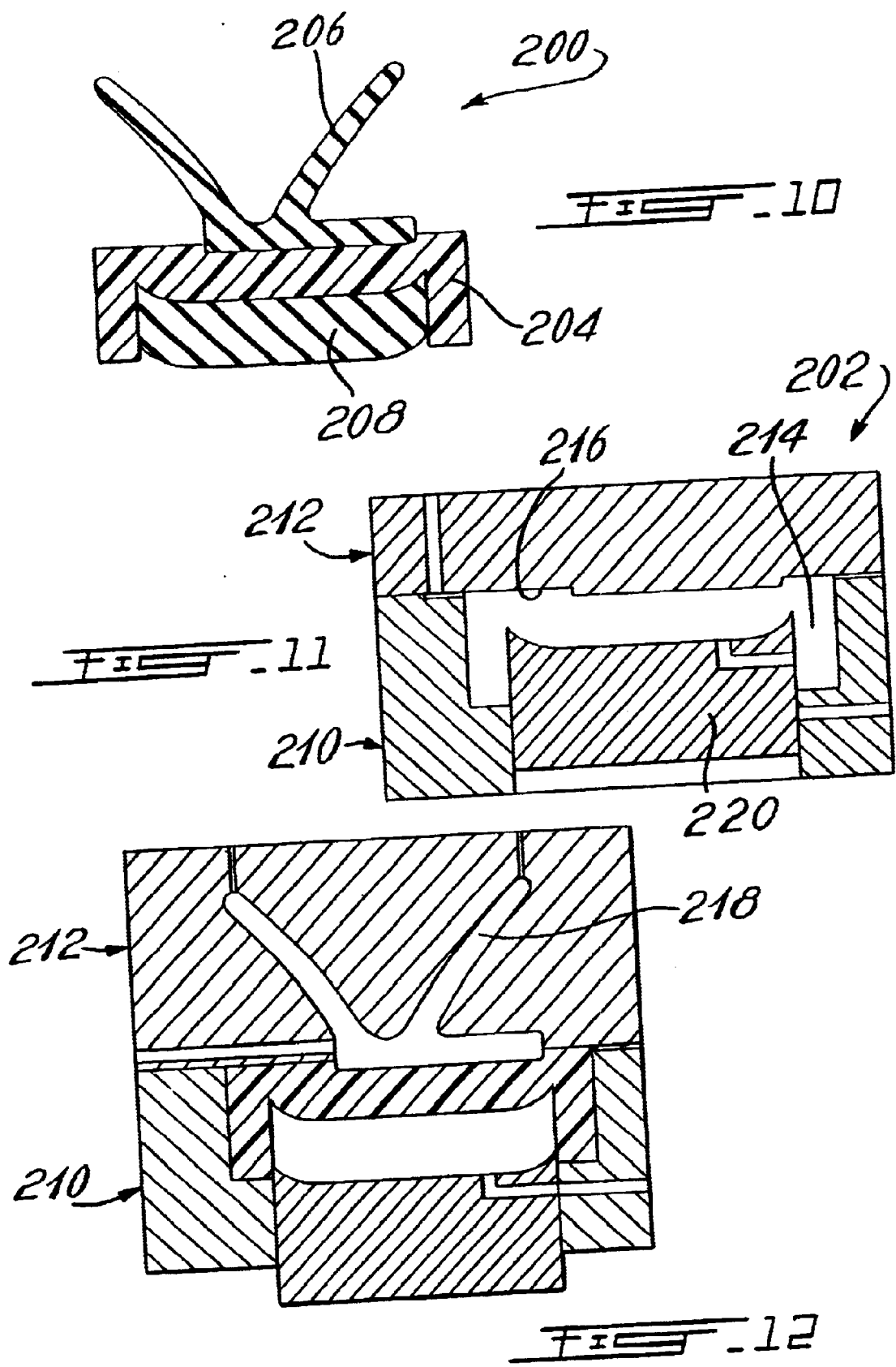

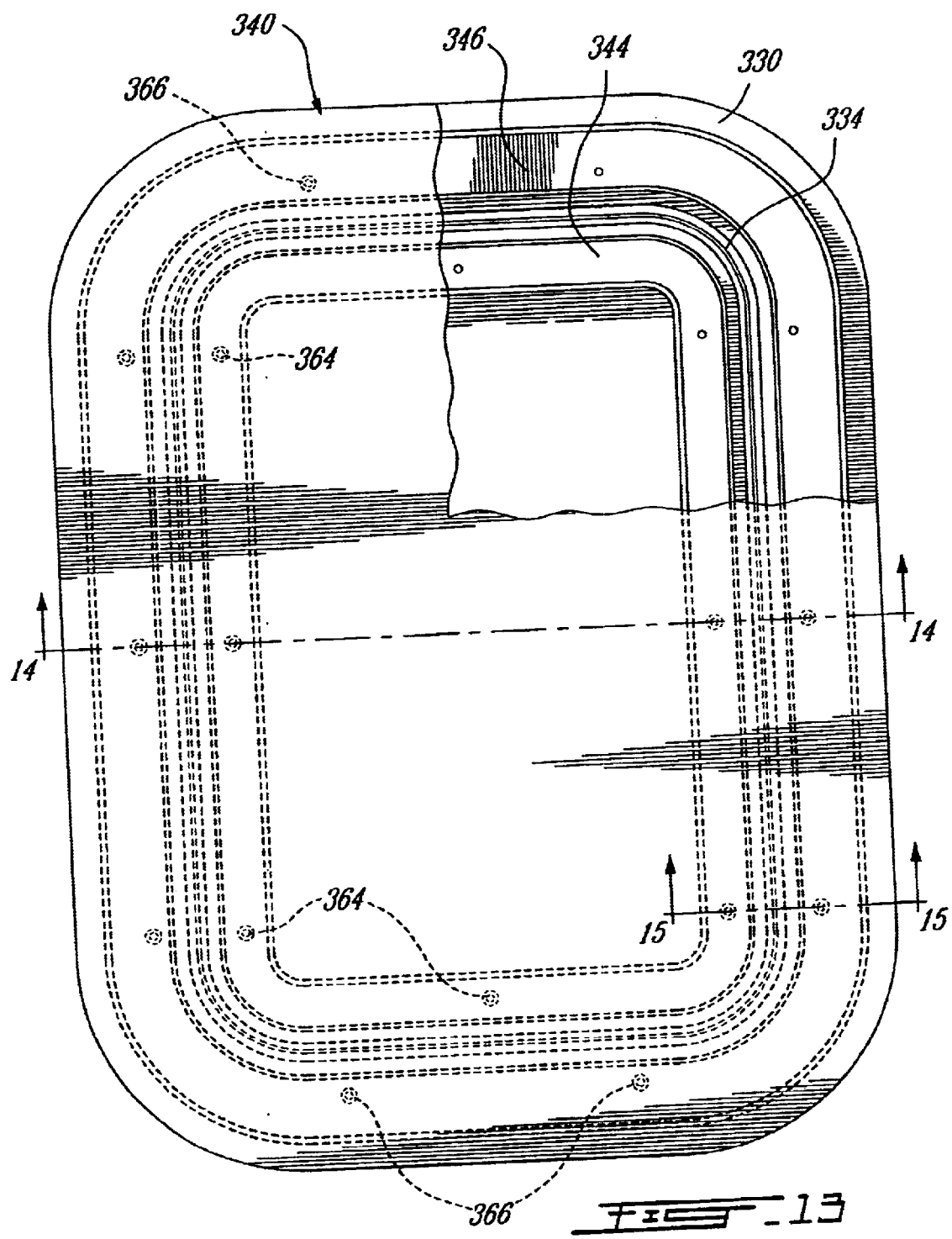

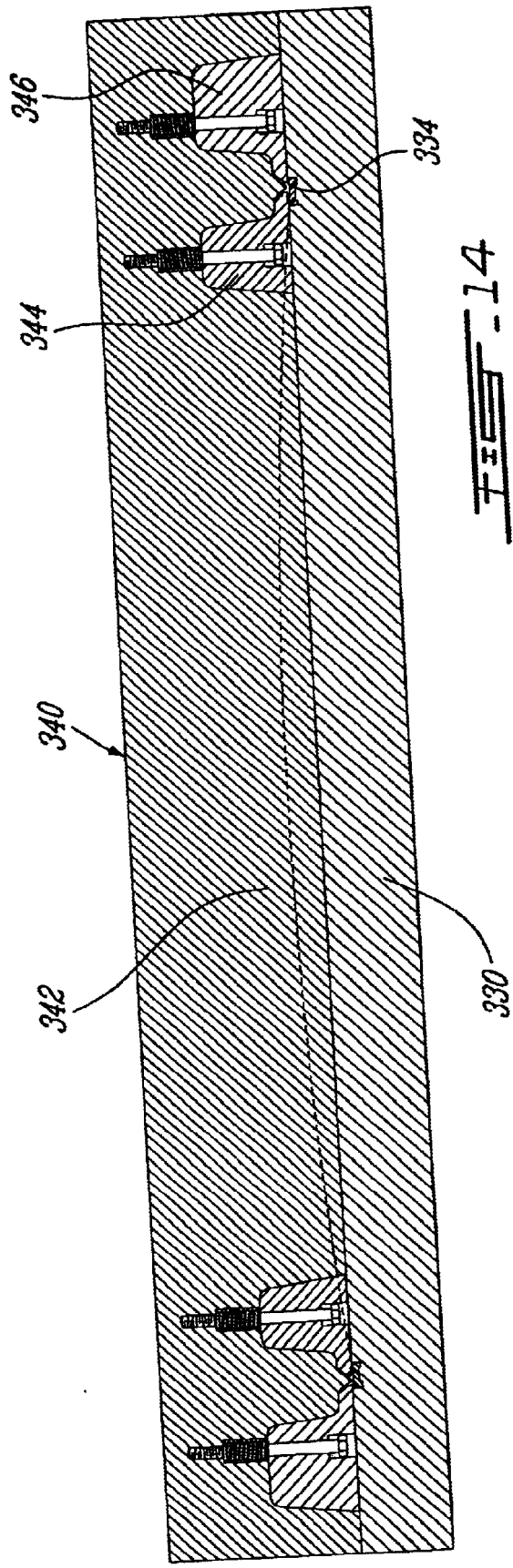

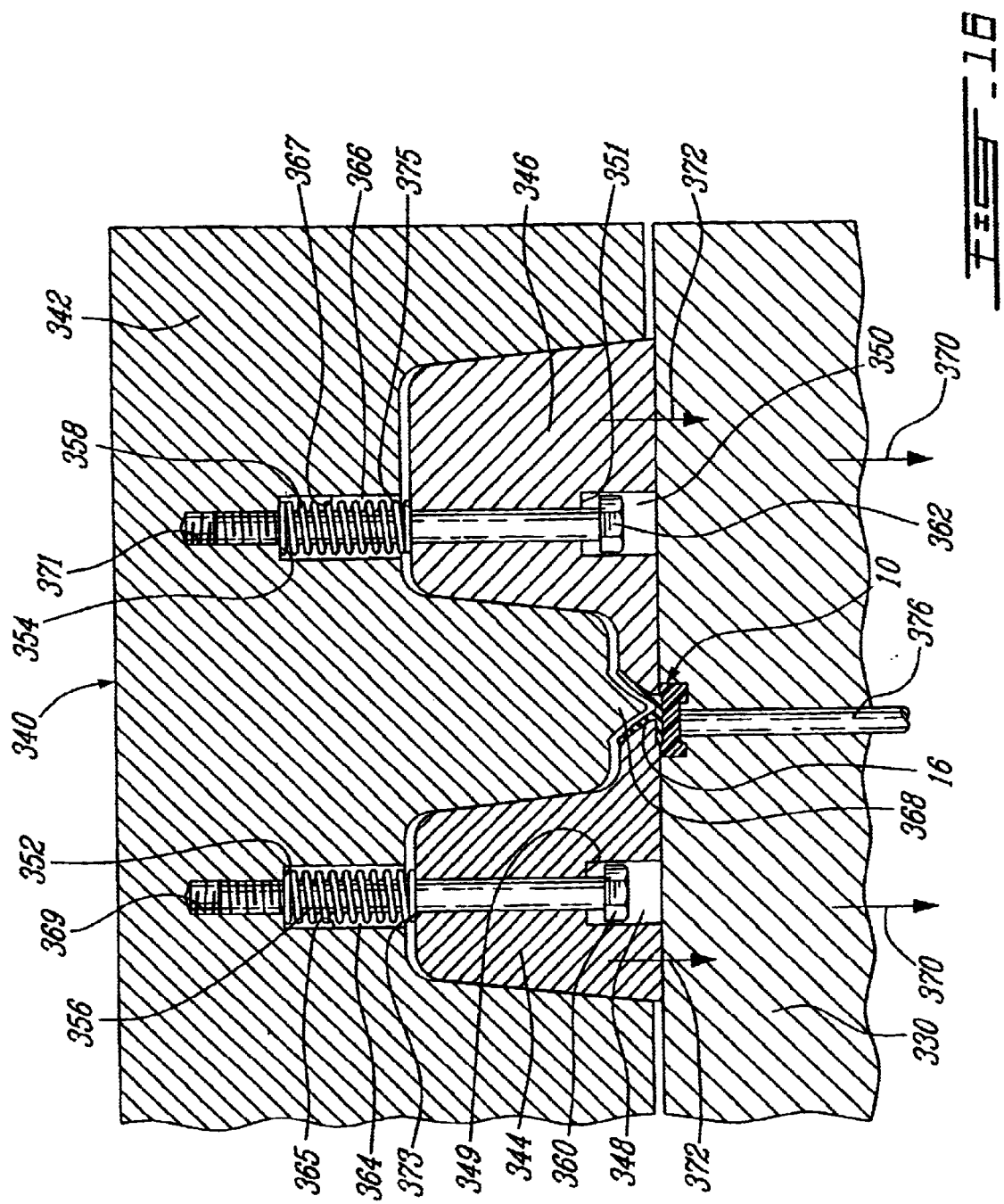

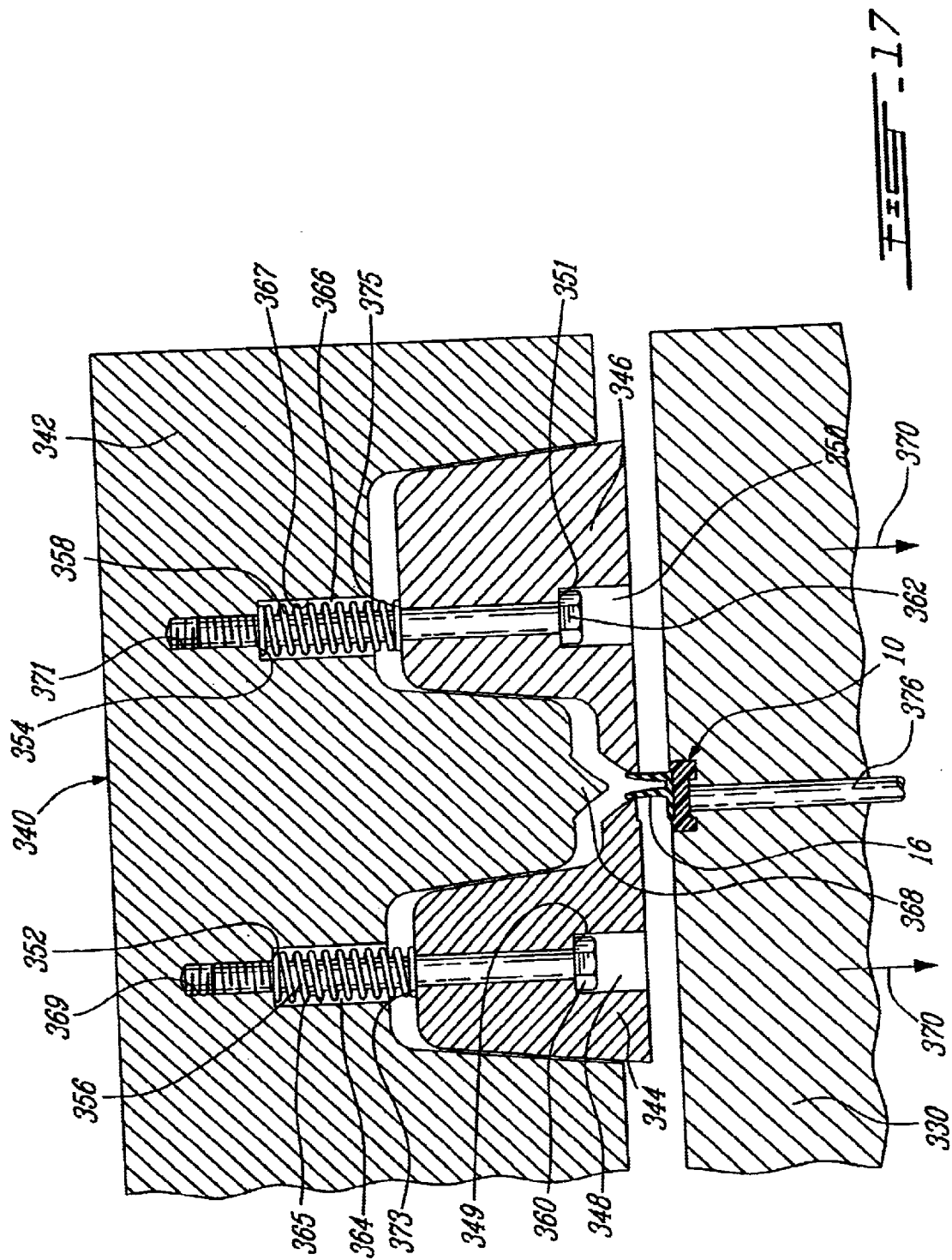

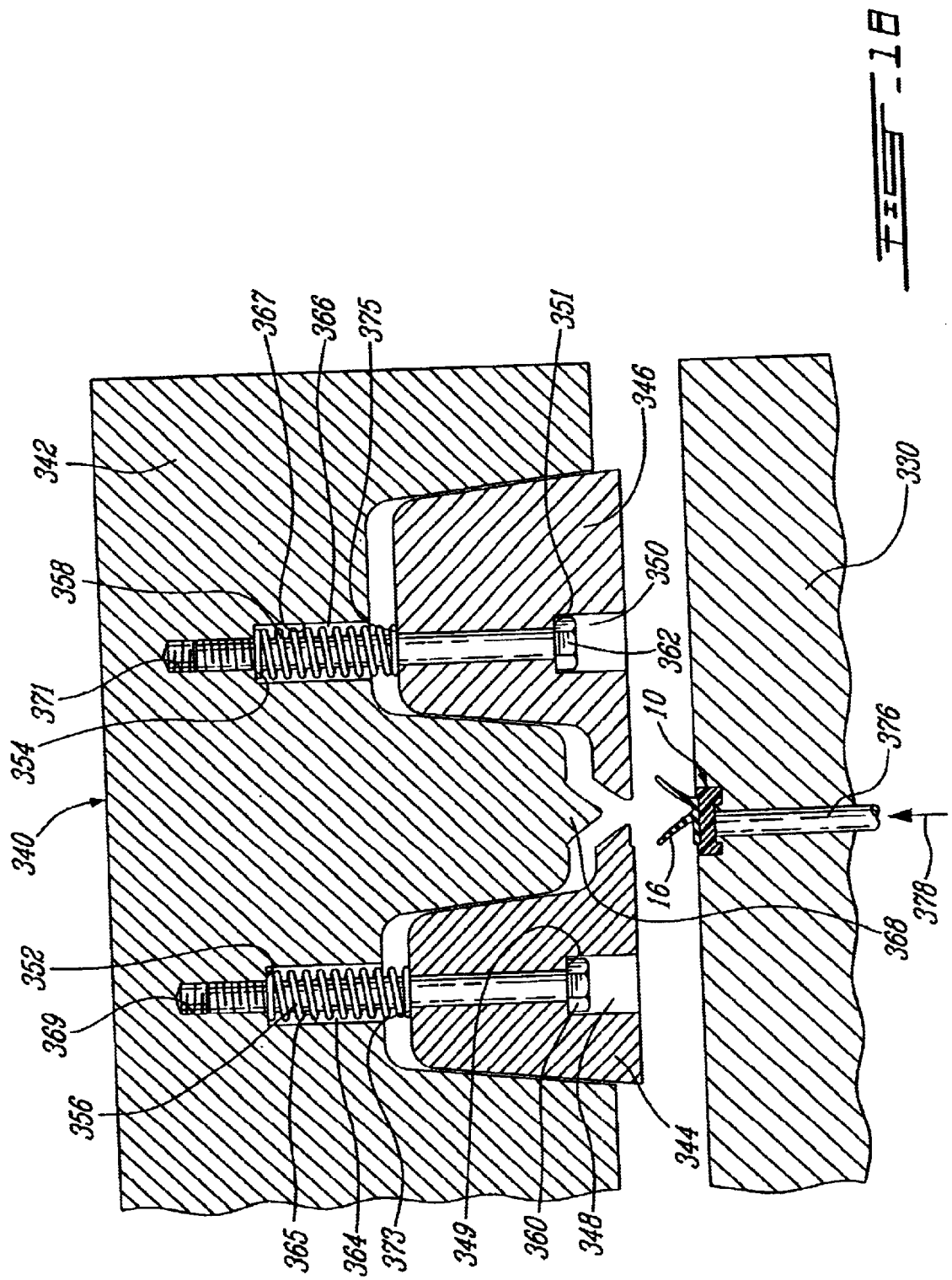

MOLD FOR MAKING A WINDOW FRAME

REFERENCE TO PRIOR APPLICATION

This is a continuation-in-part of a U.S. application Ser. No. 09/134,795, filed on Aug. 14, 1998 now abandoned.

FIELD OF THE INVENTION

The present invention pertains to a method of forming a frame made of synthetic plastic material by molding at least one resilient lip seal of resilient material to a frame of rigid thermoplastic material to form an integral assembly, all operations being done by a single injection molding machine. The present invention is also concerned with a mold cavity for making such a window frame. Alternatively, the present invention is also concerned with a window made of see-through thermoplastic material and provided with an integral peripheral lip seal, and with a method for forming such a window.

BACKGROUND OF THE INVENTION

Forming window frames using more than one type of plastic material is well known in the art. These window frames are usually provided with a rigid frame portion made of a rigid thermoplastic material and a deformable seal portion made of resilient material.

One method for making such window frames is to separately mold the rigid frame portion and the deformable seal portion and subsequently assemble these two portions mechanically. This method has the significant drawback of requiring post-molding assembly operations that usually increase the production cost of the window frames. Furthermore, since the deformable seal portion is usually made from an extrusion process, the profile of this portion is constant around the periphery of the frame which may be a drawback in some applications.

Another method for making window frames made of more than one type of plastic material consists of a three-step process. First, the frame portion is molded in a first mold assembly. The frame portion is then ejected from the first mold assembly and mounted to a second mold assembly. Finally, the deformable seal portion is molded, in the second mold assembly, directly onto the surface of the frame portion. U.S. Pat. No. 5,503,452 issued on Apr. 2, 1996 to Moretz et al. describes such a method to make a vehicle tilt-out window with seal insert. A major drawback of this technique is that two molds and two injection molding machines are required to form the window frame, resulting in handling and part dimensions problems which affect both the quality and the cost of the product.

OBJECTS OF THE INVENTION

It is an object of the present invention to provide an improved method of forming a frame.

It is another object of the present invention to provide a method of molding a frame in a single injection molding machine having multiple identical cores and multiple non-identical cavities.

SUMMARY OF THE INVENTION

More specifically, in accordance with the present invention, there is provided a method of forming, in a single injection molding machine having core portion including first and second identical cores provided with movable inserts and a cavity portion including first and second non-identical cavities, a frame of rigid thermoplastic having generally inverted U-shaped cross-section defining a concave portion; the frame also having an integral resilient lip seal and an integral deformable sealing joint provided in the concave portion of the rigid frame, the method comprising the steps of:

molding a frame of rigid thermoplastic material in the first core and in the first cavity defining together a frame configuration having a generally inverted U-shaped cross-section;

opening the mold while maintaining the molded frame in the first core;

moving the core portion so as to bring the first core in line with the second cavity defining a lip seal configuration whereby, simultaneously, bringing the second core in line with the first cavity;

moving the movable insert of the first core so as to open the concave portion of the frame;

closing the mold;

simultaneously a) molding a lip seal by injecting a resilient material over the previously molded frame in the first core and in the second cavity defining a lip seal configuration, b) molding a sealing joint by injecting a deformable material in the concave portion of the frame, and c) molding, in the second core and the first cavity, a second frame of rigid thermoplastic material;

opening the mold moving the movable insert of the first core so as to close the concave portion of the frame; and ejecting the first formed frame with lip seal.

According to another aspect of the present invention, there is provided a mold for making a frame of rigid material having a resilient lip seal; the mold comprising:

a core portion provided with at least first and second identical cores;

a cavity portion having at least a) a first cavity configured and sized to mold the rigid material of the frame, and b) a second cavity configured and sized to mold the resilient lip seal; the cavity portion being so mounted to the mold as to be movable in a predetermined direction between a closed position where the cavity portion contacts the core portion and an open position where the cavity portion does not contact the core portion; the second cavity including:

a body;

an internal stripper ring so mounted to the body as to be movable in the predetermined direction;

an external stripper ring so mounted to the body as to be movable in the predetermined direction; whereby movements of the internal and external stripper ring in the predetermined direction allow the resilient lip seal to be removed from the second cavity.

According to a third aspect of the present invention, there is provided a mold for making a frame of rigid material having a resilient lip seal; the mold comprising:

a core portion provided with at least first and second identical cores;

a cavity portion having at least a) a first cavity configured and sized to mold the rigid material of the frame, and b) a second cavity configured and sized to mold the resilient lip seal; the second cavity including:

a body provided with at least two first threaded apertures and at least two second threaded apertures;

an internal stripper ring provided with at least two shouldered apertures corresponding to the at least two first threaded apertures of the body;

at least two first compression springs mounted in the first shouldered apertures;

at least two first fastener; each the first fastener being engaged in one of the at least two first threaded apertures of the body through both one of the at least two first compression spring and one of the at least two first shouldered apertures;

an external stripper ring provided with at least two shouldered apertures corresponding to the at least two second threaded apertures of the body;

at least two second compression springs mounted in the second shouldered apertures;

at least two second fasteners; each the second fastener being engaged in one of the threaded apertures of the body through both one of the second compression spring and one of the second shouldered aperture;

whereby the internal and external stripper rings are so mounted to the body through the fasteners and the compression springs that both the internal and external stripper rings may move independently with respect to the body to thereby allow the resilient lip seal to be removed from the second cavity.

According to yet another aspect of the present invention, there is provided a window made of plastic material, the window comprising:

a generally rectangular body made of a see-through plastic material; the generally rectangular body including a generally thick peripheral portion; and an resilient lip seal mounted to the generally thick peripheral portion of the body.

Finally, according to another aspect of the present invention, there is provided a method of forming, in a single injection molding machine having core portion including first and second identical cores and a cavity portion including first and second non-identical cavities, a window of see-through rigid thermoplastic material having an integral resilient lip seal, the method comprising:

molding a window of see-through rigid thermoplastic material in the first core and in the first cavity defining a window configuration;

opening the mold while maintaining the molded window in the first core;

moving the core portion so as to bring the first core in line with the second cavity defining a lip seal configuration whereby, simultaneously, bringing the second core without a frame in line with the first cavity;

closing the mold;

molding a lip seal by injecting a resilient material over the previously molded window in the first core and in the second cavity defining a lip seal configuration, while simultaneously molding, in the second core and the first cavity, a second window of see-through rigid thermoplastic material;

opening the mold and ejecting the first formed window with integral lip seal.

Other objects, advantages and features of the present invention will become more apparent upon reading of the following non restrictive description of preferred embodiments thereof, given by way of example only with reference to the accompanying drawings.

BRIEF DESCRIPTION OF THE DRAWINGS

In the appended drawings:

FIG. 1 is an elevational view of a vehicle tilt-out glass panel used in connection with an embodiment of the present invention;

FIG. 2 is an elevational view of the window frame made in accordance with an embodiment of the present invention;

FIG. 10 is a sectional view of a frame according to another aspect of the present invention;

FIG. 11 is a schematic sectional view of a mold assembly used to form the frame of FIG. 10, the mold being shown in a configuration to form the rigid part of the frame;

FIG. 12 is a schematic sectional view of the mold of FIG. 11, shown in a configuration to form both the flexible part of the frame and the sealing part of the frame;

FIG. 13 is a schematic partly sectional top plan view of a mold illustrating another aspect of the present invention;

FIG. 14 is a sectional view taken along line 14—14 of FIG. 13;

FIGS. 16 to 18 illustrate various states during the opening of the mold of FIG. 13.

DESCRIPTION OF THE INVENTION

Referring now to FIGS. 1, 2, 3 and 7 of the appended drawings, a tilt-out window frame 10 made according to the method of the present invention will be described. This type of tilt-out window frame is well known in the art and is usually mounted as a side vent window in a truck cab or van body.

The window frame 10 serves to mount, within the vehicle window opening, a window glass panel 12 in a pivotal manner for movement between open and closed positions. As can be better seen from FIG. 3, the window frame 10 is usually fixedly mounted to the frame 11 of the vehicle while the glass panel 12 is usually attached to the window frame 10 by a hinge system (not shown). Alternatively, as will be further described with reference to FIG. 7, the window frame 10 may be fixedly mounted to the glass panel 12 and pivotally mounted to the vehicle's frame 11.

Figure 3:
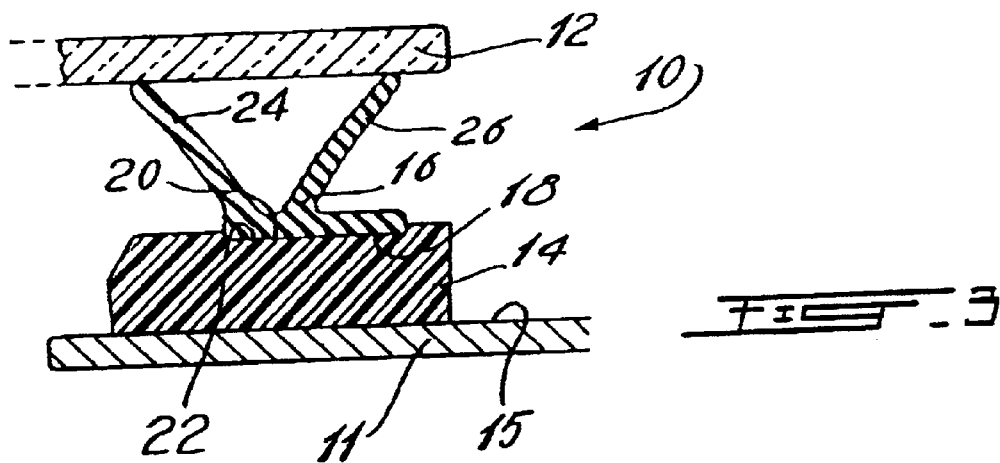
FIG. 3 is a cross-sectional view taken along lines 3—3 of FIG. 2 with the addition of a glass panel.

Referring now more particularly to FIG. 3, the frame 10 is formed of two parts: a rigid thermoplastic material part 14 and a resilient material part 16 defining a generally V-shaped lip seal. On the one hand, the rigid thermoplastic material part 14 may be made of any suitable rigid thermoplastic material such as, for example, polypropylene. On the other hand, the resilient material part may be made of any suitable resilient material such as, for example, thermoplastic elastomers.

An undersurface 18 of part 16 is chemically bonded at 20 to the top surface 22 of the rigid plastic material part 14. The top surface of part 16 displays a pair of lips 24 and 26 which are configured and sized to sealingly contact the glass panel 12 when the glass panel is in its closed position. The frame 10 is shown fixedly mounted to the outer surface 15 of the frame 11 of the vehicle near the window opening.

As will be apparent to one skilled in the art, the window frame 10 may be mounted to the frame 11 via adhesives or other conventional fasteners (not shown). If discrete fasteners are used, a sealing joint (not shown) may advantageously be provided between the window frame 10 and the frame 11.

The bond 20 between parts 14 and 16 may also alternatively be mechanical. If this is the case, the undersurface 18 and/or the top surface 22 would advantageously be provided with interlocking features (not shown) such as, for example, tapered slots or holes in order to provide an adequate mechanical bond.

Figure 7:
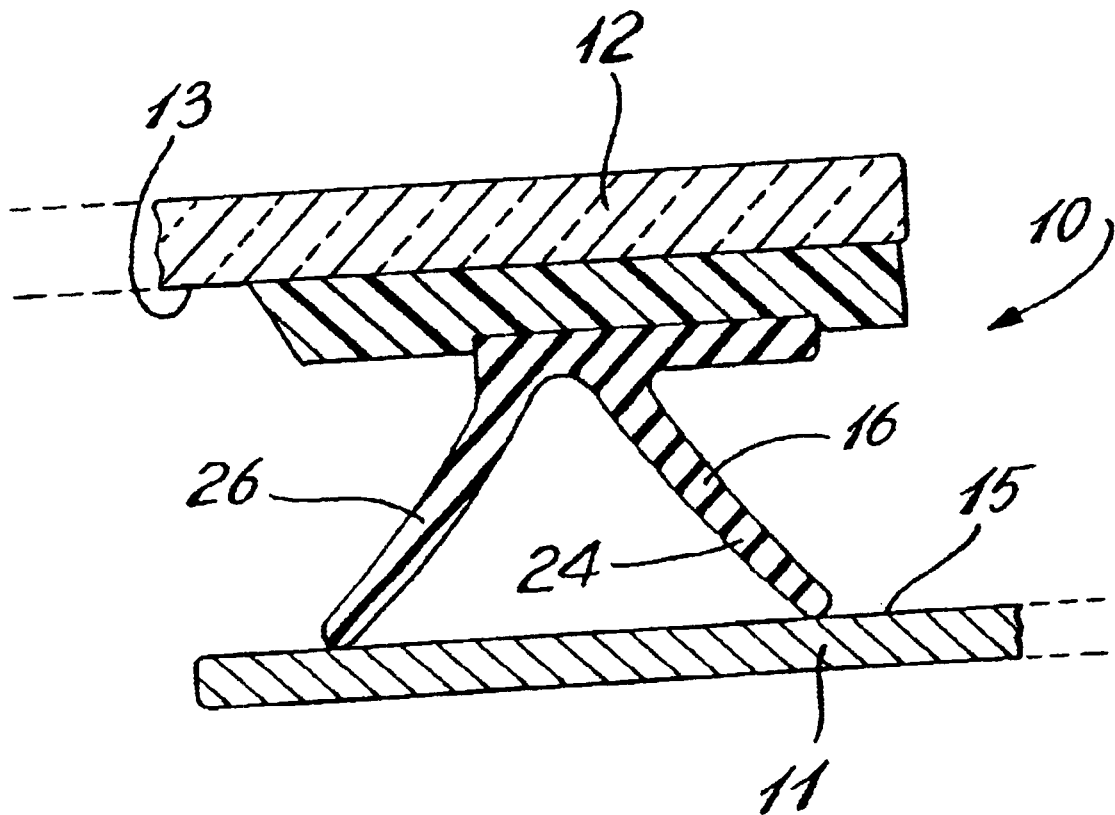
FIG. 7 is a is a cross-sectional similar to FIG. 3 where the window frame is mounted to a glass panel.

Turning now briefly to FIG. 7 of the appended drawings, the window frame 10 is shown fixedly mounted to the undersurface 13 of the glass panel 12 via an adhesive (not shown). The lips 24 and 26 will therefore sealingly contact the outer surface 15 of the frame 11 when the glass panel 12 is in its closed position.

Figure 4:
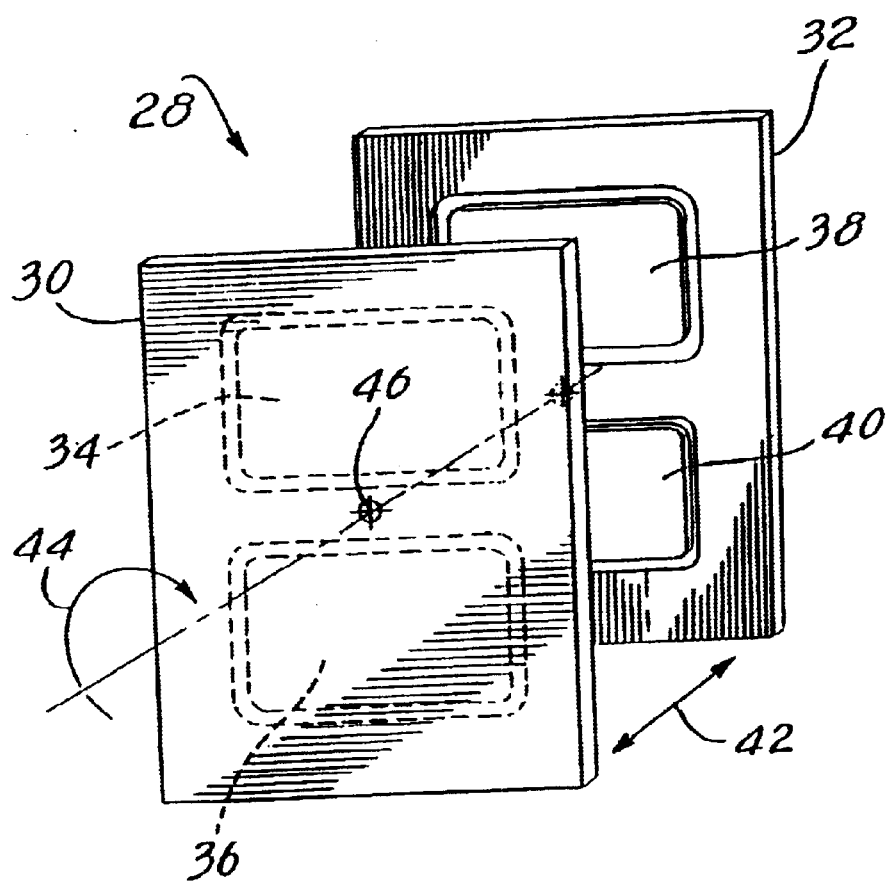
FIG. 4 is a schematic front view showing a first mold arrangement in an injection machine configured to carry out the present invention.

Referring to FIG. 4 of the appended drawings, a schematic view of a first injection machine 28 to carry out the method of the present invention will be described. The injection machine 28 includes a mold having a core portion 30 and a cavity portion 32. The core portion 30 has two identical cores 34 and 36 while the cavity portion 32 has two non-identical cavities 38 and 40.

The two identical cores 34 and 36 of the core portion 30 are configured and sized to form the undersurface of part 14 of the frame. Conversely, in the case of the cavity portion 32, cavity 38 is configured and sized to form the top surface 22 of the frame, while cavity 40 is configured and sized to form the top surface of the part 16 displaying the lips 24 and 26. Hence, the mold cores are identical but the mold cavities differ.

The core portion 30 and cavity portion 32 are not fixedly positioned with respect to one another. Arrow 42 illustrates the movement of these portions 30 and 32 to close or to open the mold assembly. Furthermore, as illustrated by arrow 44, the core portion 30 may rotate about a rotational axis 46.

It is to be noted that the representation of the injection mold 28 is schematic and that many elements have been omitted since they are not within the scope of the present invention and are not required for the understanding of the present invention by one skilled in the art.

The molding process of this embodiment of the present invention is as follows. First, a part 14 of rigid thermoplastic material is molded in the core 34 and cavity 38 assembly of the injection mold 28. The mold is then opened (see arrow 42) and the molded part 14 made of rigid thermoplastic material remains in the core 34 of the mold. The core portion 30 is then rotated about the rotation axis 46 as indicated by arrow 44 to align the core 34 with the cavity 40 which is configured to form a lip seal. Simultaneously, core 36, without a part, comes in line with cavity 38. Subsequently, the mold is closed (see arrow 42) and a flexible part 16 is formed by injecting a resilient material over the rigid part 14 molded previously. Of course, at the same time, another rigid part 14 is molded in the core 36 and the cavity 38.

The mold is then opened, the complete frame 10 is ejected from the core 34 of the core portion 30 while the other rigid part 14 is maintained in the core 36. The core portion 30 is then rotated to that the core 34 and the cavity 38 are once more aligned and the process is repeated.

It is to be noted that the movements of the core portion 30 could be different from the rotational movements described hereinabove, as long as these movements allow one core to be alternatively positioned in front of two different cavities.

As mentioned above, the bond between the rigid plastic material and the resilient material may be done by heat from the injection of the second material if both materials are chemically compatible, like polypropylene and a thermoplastic elastomer such as, for example, Santoprene™. In the case where the materials are not chemically compatible, the bond can be mechanical as described hereinabove.

It is also to be noted that the cavities 38 and 40 could be designed to mold two different materials at the same time. For example, the two lips 24 and 26 could be made of different materials in a single operation. Of course, the design of the flexible part 16 should advantageously be changed so that the two lips 24 and 26 are slightly spaced apart, to prevent the two different materials to mix.

Figure 5:
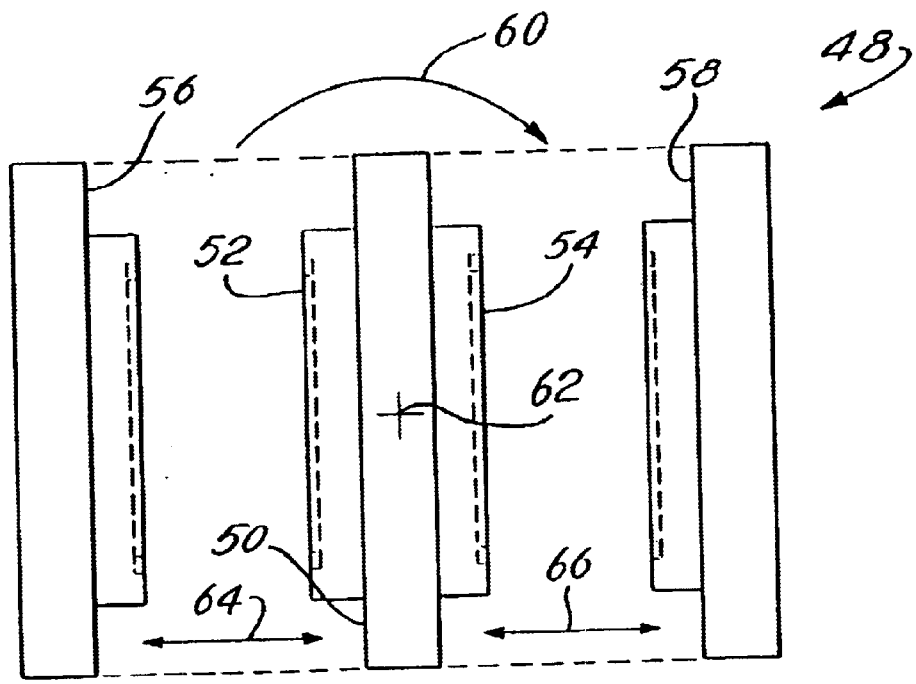
FIG. 5 is a schematic top view showing a second mold arrangement in an injection machine configured to carry out the present invention.

Referring now to FIG. 5 of the appended drawings, a schematic view of a second injection machine 48 to carry out the method of the present invention will be described. It is to be noted that the general mode of operation of the injection machine 48 is very similar to the mode of operation of the injection machine 28 of FIG. 4.

The injection machine 48 includes a three-section mold. This mold includes a core portion 50 provided with opposite identical core 52 and 54, a first cavity portion 56 configured as a rigid part 14 cavity and a second cavity portion 58 configured as a flexible part 16 cavity. The first and second cavity portions are so mounted to the injection machine as to face one of the cores 52, 54 of the core portion 50.

The core portion 50 may be rotated (see arrow 60) about a rotation axis 62 while the first and second cavity portions 56, 58 may be moved (see respective arrows 64, 66) to close or to open the mold.

The operation of the injection machine 48 is similar to the operation of the injection machine 28 of FIG. 4. Indeed, the core portion 50 is rotated 180 degrees as indicated by arrow 60 after a first molding step where the rigid part 14 has been molded.

As will be easily understood by one skilled in the art, the method of the present invention is not limited in scope to the production of vehicle window frames such as frame 10.

Figure 6:
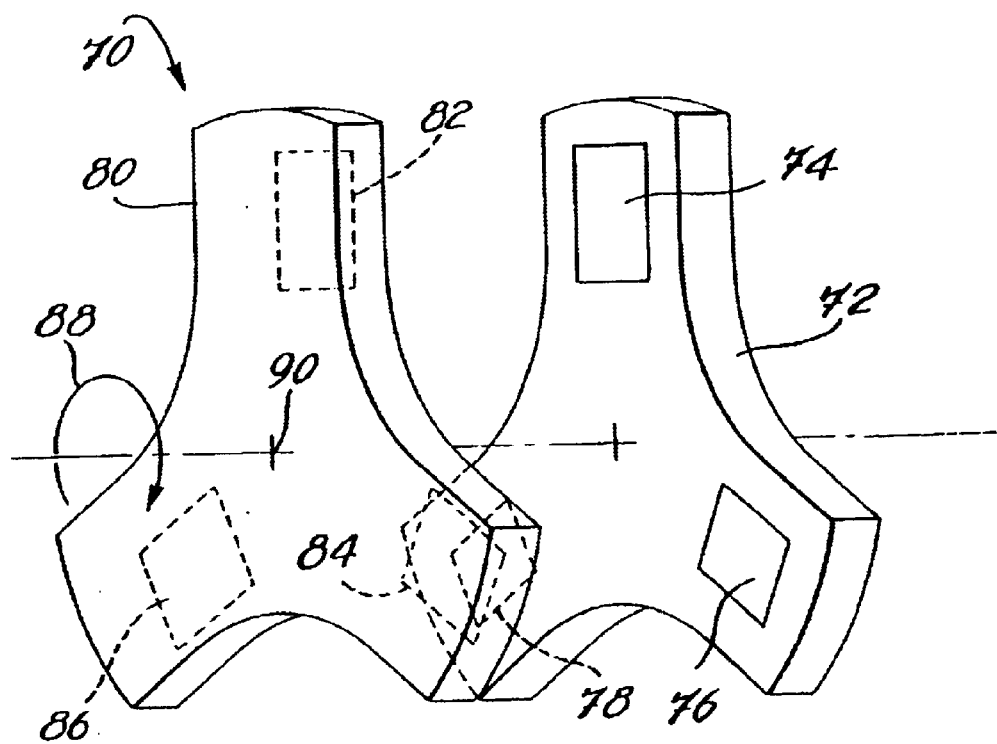
FIG. 6 is a schematic front elevational view showing a third mold arrangement in an injection machine configured to carry out the present invention.

FIG. 6 of the appended drawings, illustrates that the number of types of plastic material forming a particular article to be molded according to the method of the present invention is not limited to two. As a non-limiting example, the lip 24 and the lip 26 could be formed of different plastic material.

A two-portion mold 70 includes a cavity portion 72 provided with three non-identical cavities 74, 76 and 78, and a core portion 80 provided with three identical cores 82, 84, and 86.

Again, the core portion 80 may rotate (see arrow 88) about a rotational axis 90 so as to align the cores 82, 84 and 86 with different cavities 74, 76 and 78 for different molding operations.

As will be easily understood by one skilled in the art, the method of the present invention allows the designer to vary the profile of the part 16 (FIG. 3) defining the lips 24 and 26 according to the position onto the frame.

Figure 8:
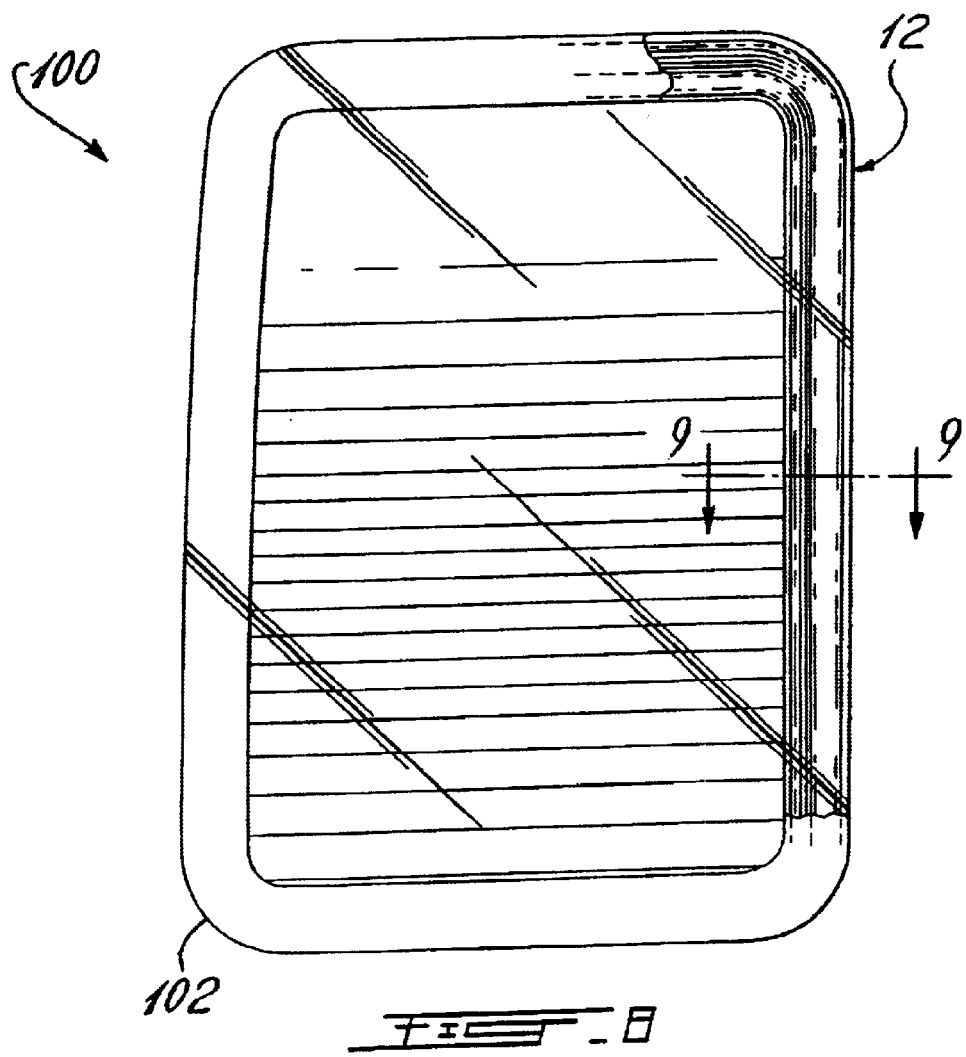
FIG. 8 is an elevational view of a vehicle tilt-out transparent plastic panel incorporating a frame according to an other aspect of the present invention.
Figure 9:
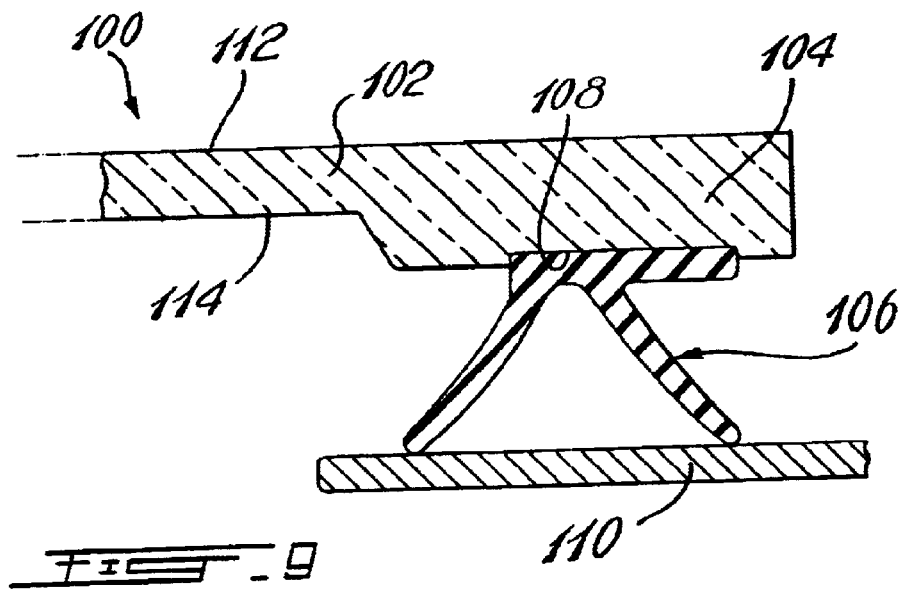
FIG. 9 is a sectional view taken along line 9—9 of FIG. 8.

Turning now to FIGS. 8 and 9 of the appended drawings, a window 100 made of see-through plastic material, according to another aspect of the present invention, will be described.

The window 100 is defined by a generally rectangular body 102 made of a see-through plastic material, such as for example polycarbonate, provided with a generally thick peripheral portion 104 and a resilient lip seal 106 mounted to the generally thick peripheral portion 104 of the body 102. More specifically, the resilient lip seal 106 is mounted in a shallow peripheral channel 108 of the peripheral portion 104 of the body 102.

It is to be noted that in the present description and in the appended claims, the expression "see-through" is to be construed as meaning transparent or translucent. Therefore, see-through plastic material is generally defined by plastic material that, in its final form, is either transparent or translucent.

The window 100 may be pivotally mounted, through hinges (not shown) in the proximity of an opening of a vehicle (see frame 110) to allow selective closure of this opening.

The window 100 is advantageously made according to the method of the present invention. More specifically, injection machines as schematically illustrated in FIG. 4 or 5 could be used to form the window 100. Indeed. The identical cores would be configured to form the external surface 112 of the window 100, while one of the cavities would be configured to form the internal surface 114 of the window 100. The other cavity would be used to mold, directly in the channel 108, the lip seal 106 as described hereinabove.

Turning now to FIGS. 10–12 of the appended drawings, a frame 200 made according to another embodiment of the present invention and an injection machine 202 suited to form the frame 200 will be described.

The frame 200 is a three-part frame. It consists of a generally inverted U-shaped rigid thermoplastic material part 204, a resilient material part 206 defining a generally V-shaped lip seal and a deformable sealing joint 208. More specifically, the deformable sealing joint 208 is molded in the concave portion defined by the inverted U-shaped part 204.

As discussed hereinabove, the frame 200 is advantageously made according to the method of the present invention.

Turning now to FIGS. 11 and 12 of the appended drawings, a schematic injection machine 202, that is designed to make the frame 200 will be described.

The injection machine includes a core portion 210 and a cavity portion 212. The core portion includes two identical cores 214 (only one shown) and two non identical cavities 216 (FIG. 11) and 218 (FIG. 12).

As will easily be understood by one skilled in the art, the operation of the injection machine 202 with respect to the molding of the rigid part 204 and the lip seal 206 is identical to the operation of the machines illustrated in FIGS. 4 or 5 and will therefore not be further described herein.

In order to decrease the time required to produce a frame 200, the molding of the deformable sealing joint is done in the concave portion of the rigid part 204 during the molding of the lip seal 206 by using a movable mold insert 220. Since the use of such inserts is believed well known in the art, it will not be further described herein.

Again, if the different materials forming the parts 204, 206 and 208 are chemically compatible, the bond between these parts is made chemically during the molding operation. For example, the rigid part 204 could be made of polypropylene, the lip seal 206 could be made of a thermoplastic elastomer such as, for example, Santoprene™, and the deformable sealing joint 208 could be made of softer Santoprene™, for example.

Of course, should the materials used be incompatible, the mechanical bonds could be provided as discussed hereinabove.

Turning finally to FIGS. 13 to 18, a cavity 340 designed to mold a deformable lip seal will be described in greater details. As will easily be understood by one skilled in the art, while the cavity 340 is not illustrated as being mounted to a rotatable core portion as described hereinabove with reference to FIGS. 4 and 5, it is nevertheless designed to be mountable to such a mold assembly.

FIG. 13 illustrates, in a top plan view, a cavity 340 configured and sized to be mounted to a core portion 330.

As may be better seen from FIG. 14, the cavity 340 includes a main body 342, an internal stripper ring 344 and an external stripper ring 346. FIG. 14 illustrates the cavity 340 when it is in its closed position where it contacts the core portion 330.

Figure 15:
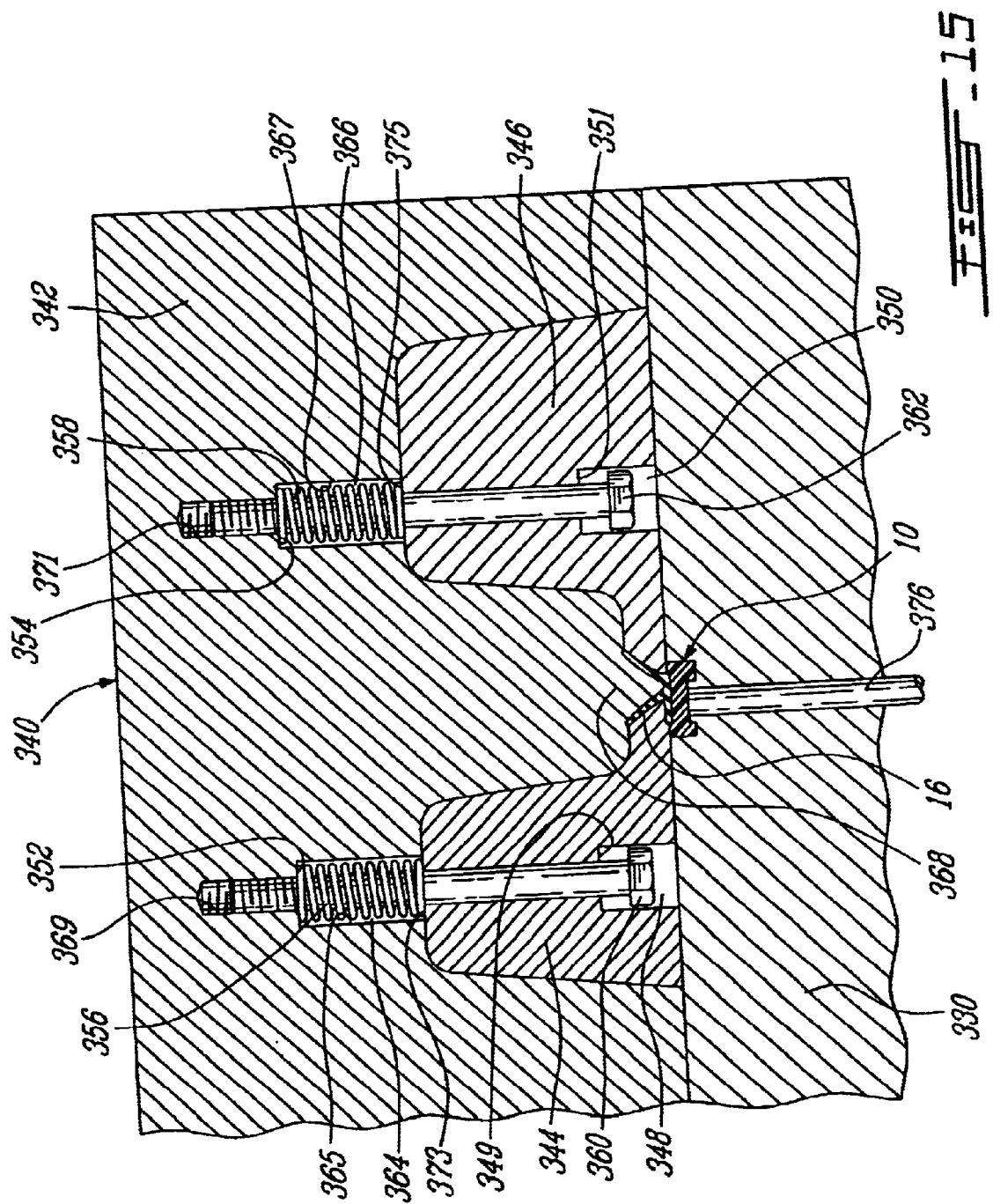
FIG. 15 is a sectional view taken along line 15—15 of FIG. 13.

Turning now to FIG. 15, which is a sectional view taken along line 15—15 of FIG. 13, the assembly of the various elements forming the cavity 340 will be described.

As can be seen from this figure, the cavity 340 includes apertures 364 and 366 respectively provided with shouldered portions 365 and 367 and with threaded portions 369 and 371.

A compression spring 356 is mounted between the shoulder 352 of the shouldered portion 365 and the internal surface 373 of the internal stripper ring 344. Similarly, a compression spring 358 is mounted between the shoulder 354 of the shouldered portion 367 and the internal surface 375 of the internal stripper ring 346.

The internal stripper ring 344 is provided with an aperture 348 having a shoulder 349. A fastener 360 is inserted through the aperture 348, through the compression spring 356, and is engaged in the threaded portion 369 of the aperture 364.

Similarly, the external stripper ring 346 is provided with an aperture 350 having a shoulder 351. A fastener 362 is inserted through the aperture 350, through the compression spring 358, and is engaged in the threaded portion 371 of the aperture 366.

The inner and outer stripper rings 344 and 346 are therefore so mounted to the body 342 of the cavity 340 that they can be independently moved with respect to the body 342 when the frame 10 is to be released from the mold as will be described hereinbelow. More specifically, the position of the compression springs 356 and 358 between the body 342 and the stripper rings 344 and 346 bias the stripper rings away from the body 342.

The stripper rings 344, 346, along with a intermediate portion 368 of the of the body 342 define the cavity where the suitable resilient material will be molded to yield the resilient part 16 of the frame 10. Of course, a rigid part of the frame 10 is previously molded in the core.

Turning now to FIGS. 16 to 18 of the drawings, the removal of the frame 10 from the cavity 340 will be described. As will easily be understood by one skilled in the art, in these figures, the cavity 340 is in its open position where the body 342 thereof does not contact the core portion 330.

In FIG. 16, arrows 370 illustrate the direction of the movement of the core portion 330 to open the mold. Since the compression springs 356 and 358 are highly compressed, the stripper rings 344 and 346 are bias ed away from the body 342 (see arrows 372) and are therefore kept in contact with the core portion 330 by the biasing action of the compression springs 356 and 358.

FIG. 17 illustrates an intermediate state of the various elements of the cavity 340 during the opening of the mold. When the mold is in the position illustrated in this figure, the head of the fasteners 360 and 362 respectively contact the shoulders 349, 351 of the apertures 348, 350 preventing further movements of the rings 344, 346 in the direction of arrows 370. Since the core 330 is still pulled away from the cavity 340 (see arrows 370), the lips defining the resilient part 16 are deformed so that the resilient part 16 may be removed from the cavity. It is to be noted that the lips are allowed to be deformed since they are no longer in contact with the intermediate portion 368 cavity 342.

Finally, FIG. 18 illustrates the completion of the removal of the frame 10 from the mold before the frame is pushed (see arrow 378) from the core 330 by a set of ejector pins 376 (only one shown). In this Figure, the stripper rings 344 and 346 are still in their fully extended positions. Of course, when the mold regains its closed position, the core portion 330 will overcome the biasing action of the springs 356 and 358 to position the stripper rings 344 and 346 in the position illustrated in 15.

As can be seen from this figure, the resilient part 16 of the frame 10 is back to its normal configuration since no force is applied to it.

As will be understood by one skilled in the art, even though the movements of the inner and outer stripper rings 344 and 346 are shown herein as being similar in amplitude and in timing, this is not a requirement. Indeed, the amplitude of the movement of one of the inner and outer stripper rings 344, 346 could be different from the other to achieve the same results.

It is to be noted that by selecting appropriate compression springs and by adjusting the threading of the bolts 360 and 362 in the threaded apertures 364 and 366, it is possible to adjust the amplitudes and speeds of the movements of the stripper rings 344 and 346 according to the type of material used or the speed of the molding machine, for example.

It is also to be noted that while the fasteners 360 and 362 are illustrated as being inserted in the compression springs 356 and 358, these fasteners could be provided at other locations as long as they limit the extension of the compression springs.

Although the invention has been described above in relation to two specific forms, it will be evident to a person skilled in the art that it may be modified and refined in various ways. It is therefore wished to have it understood that the present invention should not be limited in scope, except by the terms of the following claims.

What is claimed is:

1. A mold for making a frame of rigid material having a resilient lip seal; said mold comprising:
   a core portion provided with at least first and second identical cores;
   a cavity portion having at least a) a first cavity configured and sized to mold the rigid material of the frame, and b) a second cavity configured and sized to mold the resilient lip seal to the rigid material of the frame; said cavity portion being so mounted to said mold as to be movable in a first or second directions between a closed position where said cavity portion contacts said core portion and an open position where said cavity portion does not contact said core portion; said second cavity including:
   a body;
   an internal stripper ring so mounted to said body as to be movable in said first or second directions;
   an external stripper ring so mounted to said body as to be movable in said first or second directions;
   whereby movements of said internal and external stripper ring in said first or second directions allow said resilient lip seal to be removed from said second cavity.

2. A mold as recited in claim 1, further comprising means to mount said internal stripper ring to said body so that said internal stripper ring is biased away from said body when said cavity portion is in said open position.

3. A mold as recited in claim 2 wherein said internal stripper ring mounting means include at least one compression spring so mounted between said internal stripper ring and said body as to bias said internal stripper ring away from said body when said cavity portion is in said open position.

4. A mold as recited in claim 3, further comprising means to limit the extension of said at least one compression spring.

5. A mold as recited in claim 1, further comprising means to mount said external stripper ring to said body so that said external stripper ring is biased away from said body when said cavity portion is in said open position.

6. A mold as recited in claim 5, wherein said internal stripper ring mounting means include at least one compression spring so mounted between said internal stripper ring and said body as to bias said internal stripper ring away from said body when said cavity portion is in said open position.

7. A mold as recited in claim 6, further comprising means to limit the extension of said at least one compression spring.

8. A mold for making a frame of rigid material having a resilient lip seal; said mold comprising:
   a core portion provided with at least first and second identical cores;
   a cavity portion having at least a) a first cavity configured and sized to mold the rigid material of the frame, and b) a second cavity configured and sized to mold the resilient lip seal to the rigid material of the frame; said second cavity including:
   a body provided with at least two first apertures having a threaded portion and at least two second apertures having a threaded portion;
   an internal stripper ring provided with at least two shouldered apertures corresponding to said at least two first threaded apertures of said body;
   at least two first compression springs mounted in said first apertures;
   at least two first fasteners; each said first fastener being engaged in said threaded portion of one of said at least two first apertures of said body through both one of said at least two first compression springs and one of said at least two shouldered apertures of said internal stripper ring;
   an external stripper ring provided with at least two shouldered apertures corresponding to said at least two second apertures of said body;
   at least two second compression springs mounted in said second apertures;
   at least two second fasteners; each said second fastener being engaged in said threaded portion of one of said at least two second apertures of said body through both one of said second compression spring and one of said at least two shouldered apertures of said external stripper ring;
   whereby said internal and external stripper rings are so mounted to said body through said fasteners and said compression springs that both said internal and external stripper rings are independently movable with respect to said body to thereby allow said resilient lip seal to be removed from said second cavity.

* * * * *